Oct. 21, 1969     D. L. DOWNER     3,473,680

TRAVEL TRAY

Filed Oct. 11, 1967

INVENTOR
DAVID L. DOWNER

BY Christen, Sabel, O'Brien & Caldwell
ATTORNEYS

United States Patent Office 3,473,680
Patented Oct. 21, 1969

3,473,680
TRAVEL TRAY
David L. Downer, 57 Pingree St.,
Pontiac, Mich. 48058
Filed Oct. 11, 1967, Ser. No. 674,435
Int. Cl. B60r 7/02
U.S. Cl. 214—450                                    1 Claim

ABSTRACT OF THE DISCLOSURE

An adjustable telescopic shelf is swingably attached to the underside of a vehicle trunk lid to utilize space which is normally "dead."

---

This invention relates to automotive accessories, and particularly to a storage shelf which can be conveniently attached to the underside of the trunk lid of a vehicle for the purpose of carrying articles such as suits and dresses and other flat articles of a similar nature.

One advantage of the present invention is the fact that it enables the normally "dead" space lying directly below the curved lid of a vehicle trunk to be utilized in a practical and efficient manner.

Another advantage of this invention is that it provides additional shelf space for storing articles in a motor vehicle when traveling.

Still another advantage of the invention is that it provides shelf space which may be attached to the underside of a vehicle trunk lid and is adjustable to fit various widths of lids.

Other objects and advantages of the invention will be evident to those skilled in the art after reading the following specification in connection with the annexed drawings, in which.

Figure 1:
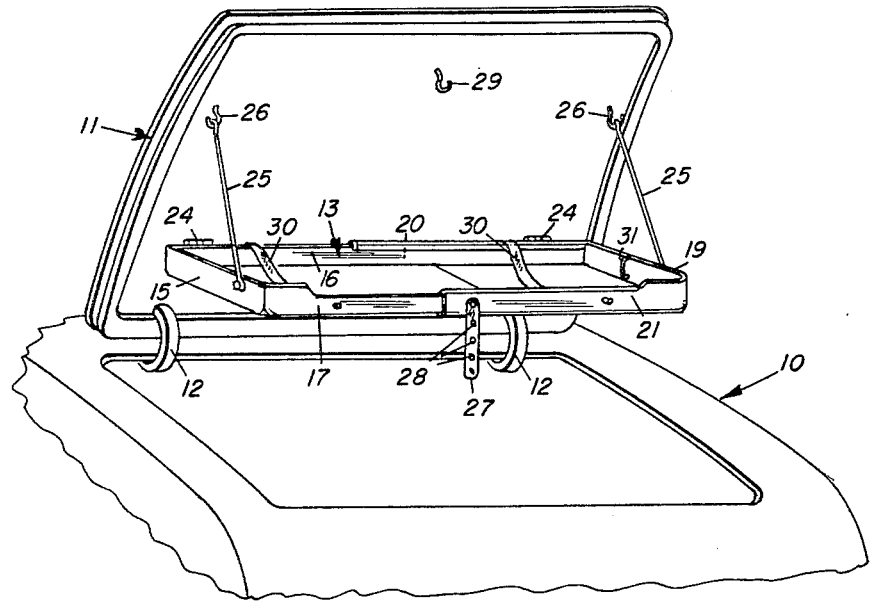
FIGURE 1 is an isometric view of a preferred form of shelf made in accordance with the present invention as attached to a trunk lid shown in an opened position.
Figure 2:
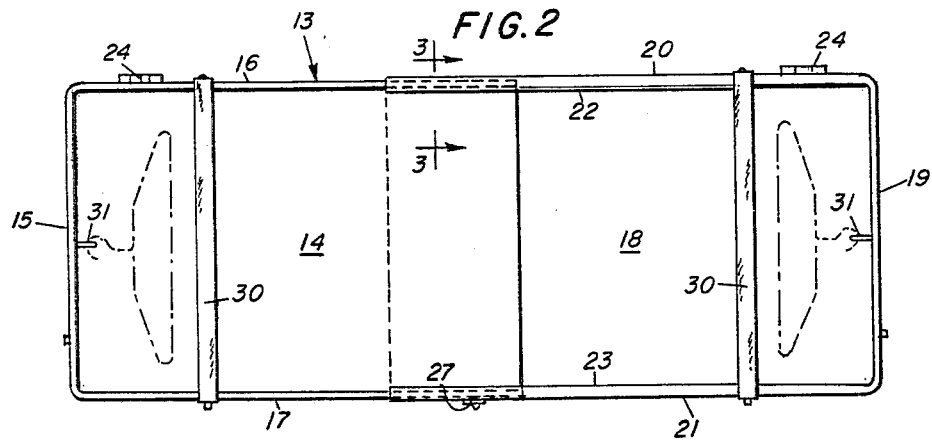
FIGURE 2 is a plan view of the shelf shown in FIGURE 1.

FIGURE 1 represents a fragmentary rear view of a typical motor vehicle showing the rear portion of the body, indicated generally by numeral 10, having a trunk lid, indicated generally by numeral 11, which is normally attached to the body at the forward edge of a trunk opening by means of the hinges 12, the trunk lid being shown in its open position with the device of the present invention, indicated generally by numeral 13, attached thereto.

The device 13 preferably comprises two shallow rectangular tray-shaped elements, one of which comprises a bottom wall 14, upstanding end wall 15 and side walls 16 and 17. The other of the trays comprises a bottom wall 18 with an upstanding end wall 19 and side walls 20 and 21. The two trays are arranged in overlapping or telescopic relationship and for this purpose the widths of the bottom 14 and 18 are approximately equal while their lengths are such that their total lengths will be somewhat more than the width of the largest trunk opening with which the device is to be used. In addition, the upper margins of the side walls of one of the trays (as for example the side walls 20 and 21) may be re-entrantly curved to provide downwardly extending marginal flanged portions 22 and 23 overlapping in slidable relationship to the corresponding side walls 16 and 17 of the other tray portion, as is shown in detail in FIGURE 3.

Thus, the two trays interfit one with another in telescopic relationship so as to be adjustable to the width of the opening in the trunk of a vehicle.

Figures 3, 4:
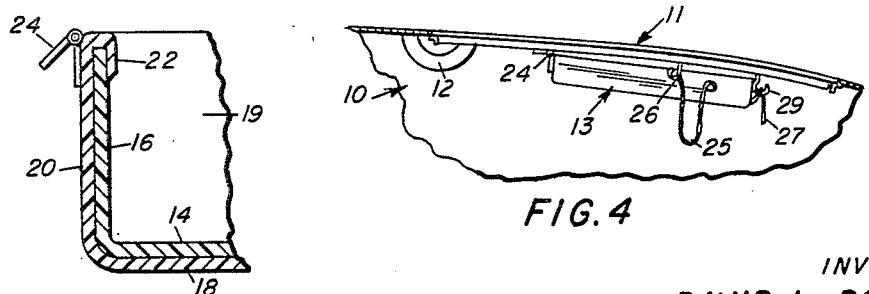
FIGURE 3 is a fragmentary section on an enlarged scale taken on line 3—3 of FIGURE 2.
FIGURE 4 is a cross-sectional elevation of the device shown in FIGURE 1 but with the trunk lid in a closed position.

In a preferred embodiment of the invention, one side of the combined pair of trays is preferably attached to the underside of a trunk lid as by means of a pair of hinges 24, while the shelf may be supported in a horizontal position when the trunk lid is raised (as in FIGURE 1) by means of flexible suspension cables, or straps, 25, one end of each being attached either to an end wall or a side wall of the shelf while the upper end can be secured to the trunk lid by means of hooks 26. Thus, when the trunk lid is raised and the shelf supported in the horizontal position, clothing or other articles may be deposited therein and are also easily accessible for removal when desired. In addition, in order to facilitate the closing of the trunk lid the shelf may be swung up into a closed position (as shown in FIGURE 4) and secured in that closed position by means of a latching mechanism, such as a short strap 27, attached at a medial point to the forward side wall of the shelf or tray; this strap being provided with a number of openings 28 to enable it to be secured to another hook 29 secured near the upper edge of the trunk lid.

As an added means for securing clothing or other articles in place one or more adjustable fastening straps 30 may be attached in crosswise arrangement to the upper edges of the side walls of the respective trays and, in addition, hooks 31 may also be provided at the ends of the trays to facilitate the positioning of supports such as clothes hangers.

It will thus be seen that the foregoing invention provides a convenient means whereby normally wasted space in the trunk of a vehicle may be utilized to advantage in view of the fact that this arrangement does not interfere with the normal use of the trunk of a vehicle for carrying larger bulky items of luggage which are normally carried therein.

I claim:

1. In automotive accessories for use with vehicles having a trunk space in the body thereof provided with an access opening thereto and a closure lid hingedly connected with said body adjacent one margin of said opening, the combination including an elongated flat tray-shaped support means having a length less than the width of said opening comprising two sections relatively movable for adjusting the over-all length of the support wherein both of said sections are provided with upstanding marginal parallel side walls, and the side walls of one of the sections are provided with re-entrantly curved upper marginal flanges, for telescopic overlapping relationship, means for attaching said support means to the under side of the closure lid for swingable movement with respect to the lid about an axis adjacent one side of the support means and parallel to the hinge axis of the closure lid, means for limiting said swingable movement in one direction for positioning the support means substantially horizontally when the closure lid is fully opened, and latching means for holding the support means in close relationship to the closure lid, said latching means comprising flexible strap means and coacting hook means, one of said last two means being attached to the lid and the other of said two means being attached to the support means, said strap means being provided with a plurality of spaced openings for connection to the hook means.

References Cited

UNITED STATES PATENTS

| | | |
|---|---|---|
| 1,309,251 | 7/1919 | Lakin. |
| 2,573,102 | 10/1951 | Hennessy. |
| 2,577,263 | 12/1951 | Myers 296—37 |
| 3,209,969 | 10/1965 | Hennagin 224—29 |
| 3,261,521 | 7/1966 | Meccico et al. 224—42.44 |
| 3,318,471 | 5/1967 | Barr 224—42.44 XR |

GERALD M. FORLENZA, Primary Examiner

U.S. Cl. X.R.

224—29, 42.44